(12) United States Patent
Hartman et al.

(10) Patent No.: US 6,253,579 B1
(45) Date of Patent: Jul. 3, 2001

(54) VALVE HAMPER ASSEMBLY

(75) Inventors: Terry E. Hartman, Northwood, OH (US); Herbert C. Kroh, LaSalle; David E. Crots, Ottawa Lake, both of MI (US)

(73) Assignee: Libbey Glass Inc., Toledo, OH (US)

( * ) Notice: Subject to any disclaimer, the term of this patent is extended or adjusted under 35 U.S.C. 154(b) by 0 days.

(21) Appl. No.: 09/275,562

(22) Filed: Mar. 24, 1999

(51) Int. Cl.$^7$ .................................................... C03B 9/335
(52) U.S. Cl. .................. 65/242; 65/322; 65/361; 251/251; 251/252; 251/253; 251/254; 251/255
(58) Field of Search ............................ 65/242, 322, 323, 65/359, 361, 321; 251/251, 252, 253, 254, 255

(56) References Cited

U.S. PATENT DOCUMENTS

| Re. 16,844 | * | 1/1928 | McCue . |
|---|---|---|---|
| 519,049 | * | 5/1894 | Spofford . |
| 604,907 | | 5/1898 | Schmunk . |
| 1,142,389 | * | 6/1915 | Allan . |
| 1,864,689 | | 6/1932 | Freese et al. . |
| 1,979,211 | * | 10/1934 | Rowe . |
| 2,075,771 | * | 3/1937 | Soubier . |
| 2,225,898 | | 12/1940 | Benoit et al. . |
| 2,811,815 | | 11/1957 | Eldred . |
| 3,127,786 | * | 4/1964 | Wooley . |
| 3,149,951 | | 9/1964 | Mennitt et al. . |
| 3,268,322 | | 8/1966 | Denman . |
| 3,529,948 | | 9/1970 | Eldred et al. . |
| 3,529,950 | | 9/1970 | Brinduse . |
| 3,788,829 | | 1/1974 | Miner et al. . |
| 3,867,123 | | 2/1975 | Hamilton . |
| 4,070,174 | | 1/1978 | Nebelung et al. . |
| 4,134,748 | | 1/1979 | Hileman . |
| 4,177,949 | * | 12/1979 | Curtis . |
| 4,225,331 | | 9/1980 | Bittner et al. . |
| 4,276,075 | | 6/1981 | Olivotto . |
| 4,283,215 | * | 8/1981 | Sherman . |
| 4,470,836 | * | 9/1984 | Delgadillo et al. . |
| 4,478,630 | | 10/1984 | Lambert . |
| 4,810,278 | | 3/1989 | Braithwaite . |
| 5,059,236 | | 10/1991 | Ito . |
| 5,215,566 | | 6/1993 | Yamamoto et al. . |
| 5,304,229 | | 4/1994 | Swanfeld . |
| 5,306,325 | | 4/1994 | Smith et al. . |
| 5,749,526 | * | 5/1998 | Laabs et al. . |
| 5,851,257 | | 12/1998 | Kroh et al. . |

OTHER PUBLICATIONS

Catalog pages entitled "Lynch Barrel Cam Press", published by Lynch Machinery–Miller Hydro, Inc. of Bainbridge, Georgia, Undated.

Catalog Pages entitled "Lynch Motor Driven Press", published by Lynch Machinery–Miller Hydro, Inc. of Bainbridge, Georgia, Undated.

* cited by examiner

Primary Examiner—Sean Vincent
(74) Attorney, Agent, or Firm—Emch, Schaffer, Schaub & Porcello Co., L.P.A.

(57) ABSTRACT

A valve hamper assembly for a glassware machine having a camming surface and a movable follower surface engaging the camming surface. A movable valve is operatively connected to the follower surface. A movement device is operatively connected to the follower surface for moving the follower surface along the camming surface to cause movement of the valve.

6 Claims, 7 Drawing Sheets

US 6,253,579 B1

VALVE HAMPER ASSEMBLY

BACKGROUND OF THE INVENTION

The present invention relates generally to a valve hamper assembly. More specifically, the invention is directed to a valve hamper assembly for positioning a valve of a glassware machine.

In the past, a valve has been adjusted using shims. The shimming process is difficult and time consuming because the shims have to be placed in exact positions in order to accurately position the valve in relation to the glassware forming mold. If the valve is inaccurately positioned, the bottom of the glassware being formed by the valve is defective. Accordingly, there is a need for valve hamper assembly that eliminates the problems associated with shims.

The present invention satisfies the above-identified need. The present invention is directed to a valve hamper assembly that includes a movable valve operatively connected to a follower surface that slidingly engages a fixed camming surface to provide relatively easy, quick and accurate positioning of the valve in relation to the mold.

SUMMARY OF THE INVENTION

The present invention is directed to a valve hamper assembly having a camming surface and a movable follower surface engaging the camming surface. A movable valve is operatively connected to the follower surface. A movement device, such as a handle, is operatively connected to the follower surface for moving the follower surface along the camming surface to cause corresponding movement of the valve.

The primary object of the present invention is to provide a valve hamper assembly that easily, quickly and accurately positions a valve of a glassware machine.

Other objects and advantages of the present invention shall become apparent to those skilled in the art upon a review of the following detailed description of the preferred embodiments and the accompanying drawings.

DETAILED DESCRIPTION OF THE PREFERRED EMBODIMENTS

Figure 1:
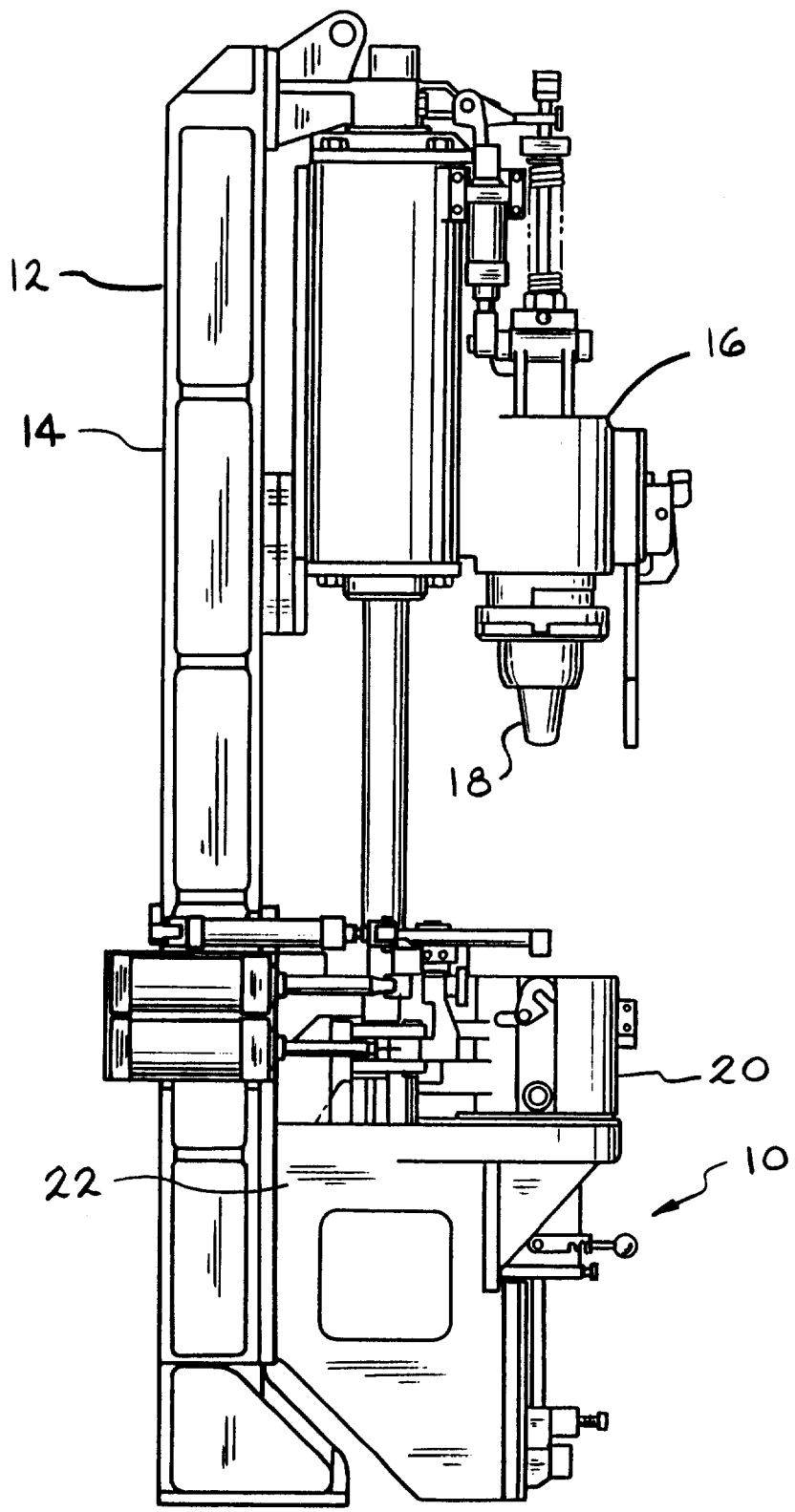
FIG. 1 is a side elevational view of a glassware machine including a valve hamper assembly according to the present invention.
Figure 2:
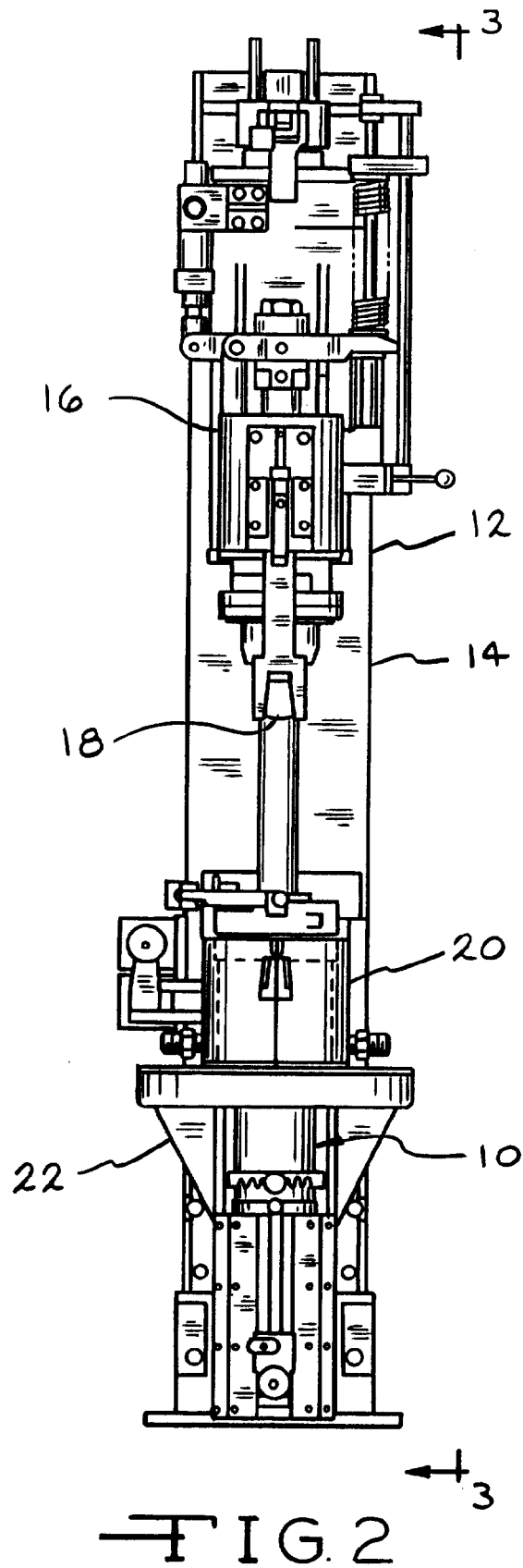
FIG. 2 is a front elevational view of the glassware machine shown in FIG. 1.
Figure 3:
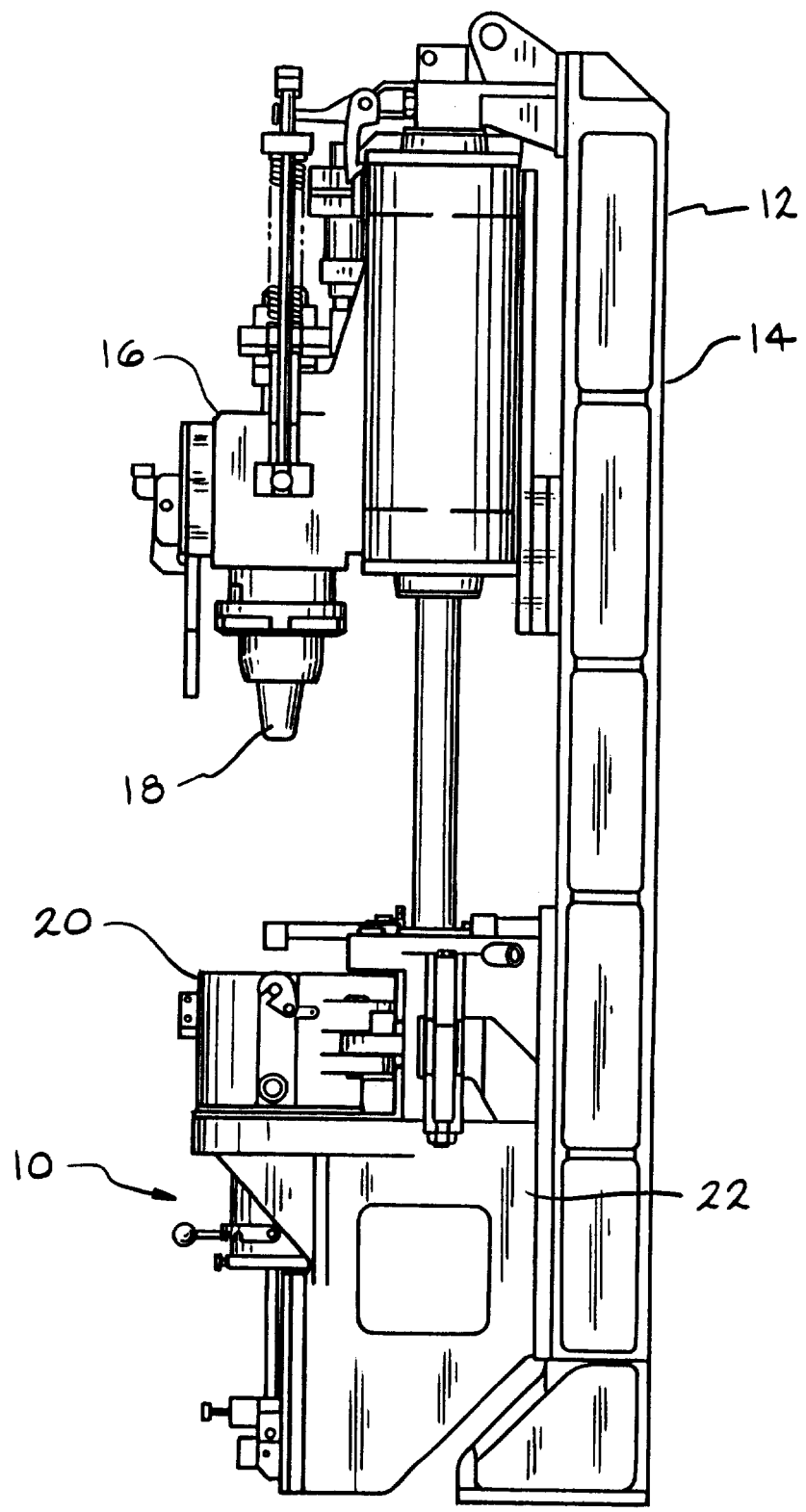
FIG. 3 is a view taken along line 3—3 of FIG. 2.

The preferred embodiments and best mode of the present invention will now be described in detail with reference being made to the drawings. In the drawings, the valve hamper assembly of the present invention is indicated generally by the reference number "10".

Referring to FIGS. 1–4, the assembly 10 can be used with a glassware machine 12 having a frame 14. A press head assembly 16 is movably mounted on the frame 14. The press head assembly 16 is includes a plunger 18. The glassware machine 12 includes a glassware forming mold 20 that is mounted on a mold support frame 22 that is in turn mounted on the frame 14. The valve hamper assembly 10 of the present invention is mounted on the mold frame 22 under the mold 20.

A plurality of glassware machines 12 is usually mounted on a rotating carousel (not shown). In a typical embodiment, twenty-four glassware machines 12 are mounted on the carousel.

Referring to FIGS. 4–8, the assembly 10 includes a housing 30 having a top 32 and a bottom 34. The housing 30 includes a generally cylindrical exterior surface 36 and a generally cylindrical interior surface 38 extending between the top 32 and the bottom 34. The top 32 of the housing 30 is fixedly attached to the mold frame 22 by bolts 40. The assembly 10 includes a base plate 42 having a top surface 44 and a bottom surface 46. The base plate 42 is fixedly attached to the bottom 34 of the housing 30 by at least one bolt 48. The base plate 42 includes a reciprocating valve stem retaining peg 50 having a first end 52 and a second end 54. A knob 56 is positioned on the second end 54 of the retaining peg 50.

Figure 5:
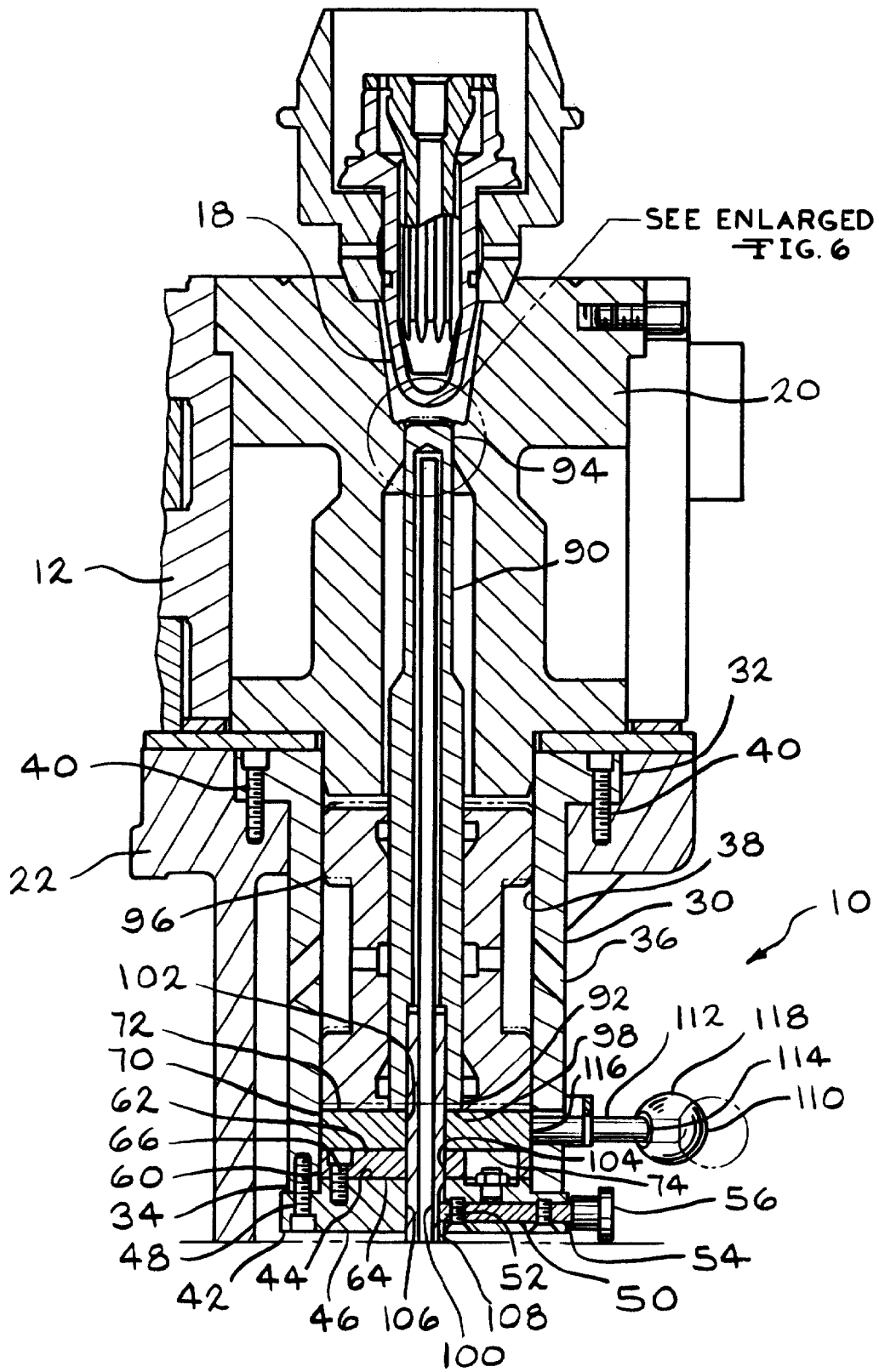
FIG. 5 is a detailed cross-sectional view taken through the center of the glassware machine and the valve hamper assembly.
Figure 7:
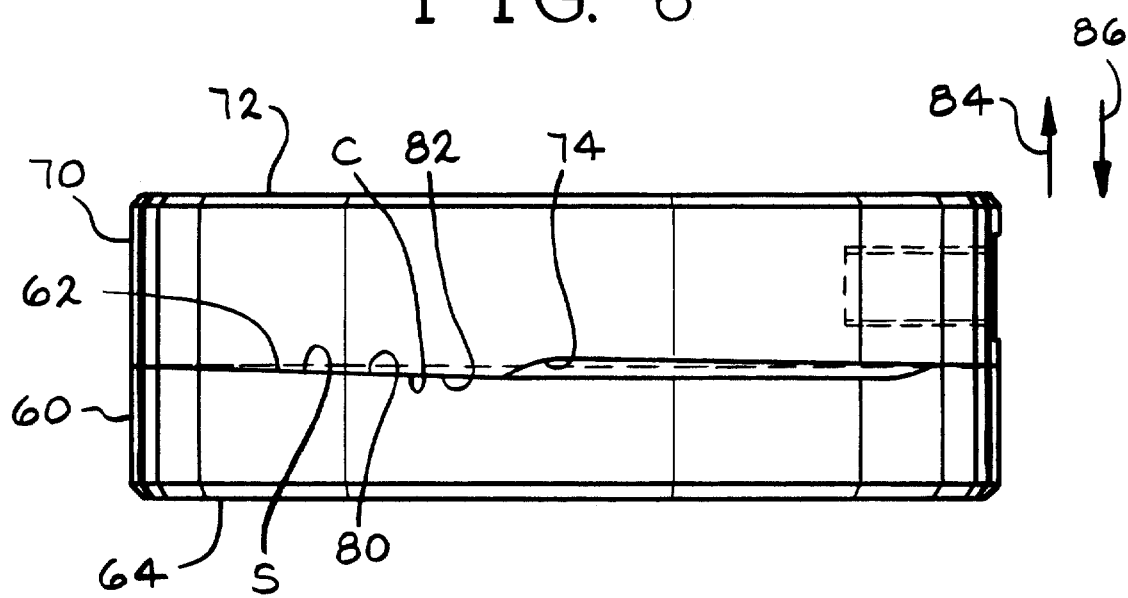
FIG. 7 is a detailed side elevational view of the fixed disk and the movable disk of the valve hamper assembly.

Referring to FIGS. 5 and 7, the assembly 10 includes a generally cylindrical fixed disk 60 that is adapted and sized for positioning adjacent to the interior surface 38 of the housing 30. The fixed disk 60 includes a top portion 62 and a bottom portion 64. As shown in FIG. 5, the fixed disk 60 is fixedly mounted on the base plate 42 by at least one bolt 66.

Still referring to FIGS. 5 and 7, the assembly 10 includes a generally cylindrical movable disk 70 that is adapted and sized to be positioned adjacent to the interior surface of the housing 30. The movable disk 70 includes an upper portion 72 and a lower portion 74. The lower portion 74 of the movable disk 70 is positioned adjacent to the top portion 62 of the fixed disk 60.

Referring to FIG. 7, the top portion 62 of the fixed disk 60 includes a camming surface 80 having a predetermined slope S. The lower portion 74 of the movable disk 70 includes a follower surface 82 having a predetermined configuration C corresponding to the predetermined slope S of the camming surface 80. The follower surface 82 slidingly engages the camming surface 80. In a preferred embodiment, the camming surface 80 has a generally cylindrical predetermined slope S. Accordingly, as the movable disk 70 is rotated, the follower surface 82 engages and travels along the camming surface 80 to cause the movable disk 70 to rise in the direction indicated by the arrow 84 in FIG. 7. Rotation of the movable disk 70 in the opposite direction causes the movable disk 70 to fall in the direction indicated by the arrow 86 in FIG. 7.

Referring to FIG. 5, the assembly 10 includes a movable glassware valve 90 having a first end 92 and a second end 94. The valve 90 is maintained in the housing 30 by a generally cylindrical valve sleeve 96 that is adapted and sized to be positioned adjacent to the interior surface 36 of the housing 30. The first end 92 of the valve 90 includes a shoulder 98 that is positioned adjacent to the upper surface 72 of the movable disk 70. Accordingly, movement of the movable disk 70 in the directions indicated by the arrows 84 and 86 in FIG. 7 causes corresponding movement of the valve 90.

Referring to FIGS. 4–6 and 8, the first end 92 of the valve 90 includes a valve stem 100. The valve stem 100 is received by a first opening 102 defined by the movable disk 70, a second opening 104 defined by the fixed disk 60 and a third opening 106 defined by the base plate 42. The valve stem 100 acts as an axis of rotation for the movable disk 70. As shown in FIG. 5, the valve stem 100 defines a longitudinally extending peg recess 108 that is adapted and sized to receive the first end 52 of the retaining peg 50. When the retaining peg 50 is inserted in the peg recess 108, as shown in FIG. 5, the valve stem 100 is maintained in the assembly 10. When the retaining peg 50 is withdrawn from the peg recess 108, the valve stem 100 and thereby the valve 90 can be removed from the assembly 10.

Figure 6:
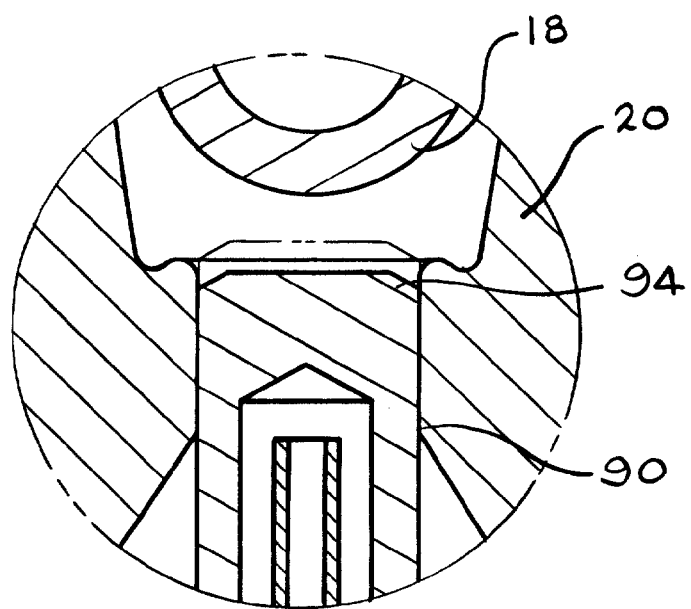
FIG. 6 is an enlarged view of the portion of the drawing shown in FIG. 5.

Referring to FIGS. 5 and 6, the second end 94 of the valve 90 is adapted and sized to form a predetermined shape in a glassware item (not shown) being formed in the mold 20. As best shown in FIG. 6, the second end 94 of the valve 90 forms the bottom of the glassware item.

Figure 4:
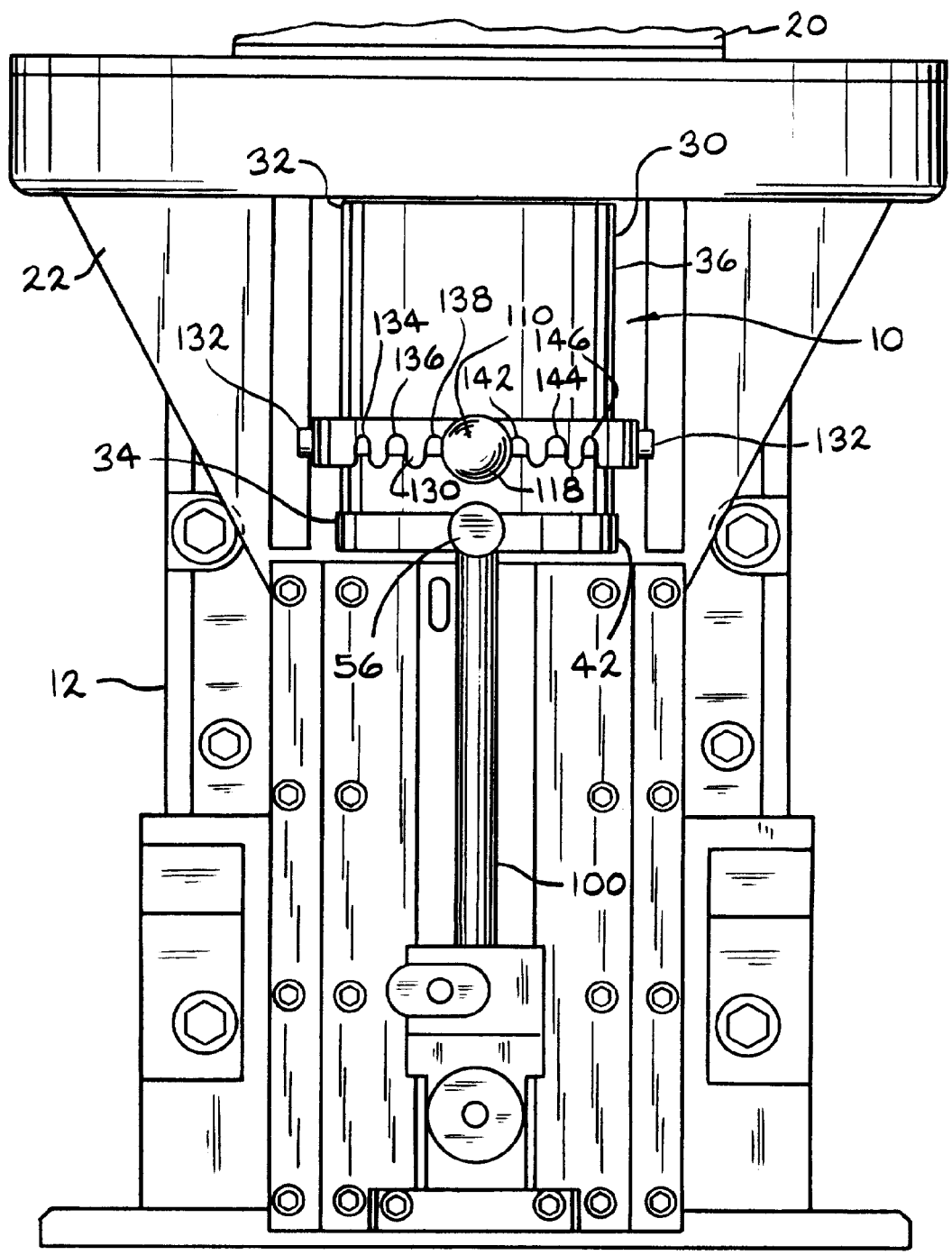
FIG. 4 is a detailed front elevational view of the valve hamper assembly according to the present invention.
Figure 8:
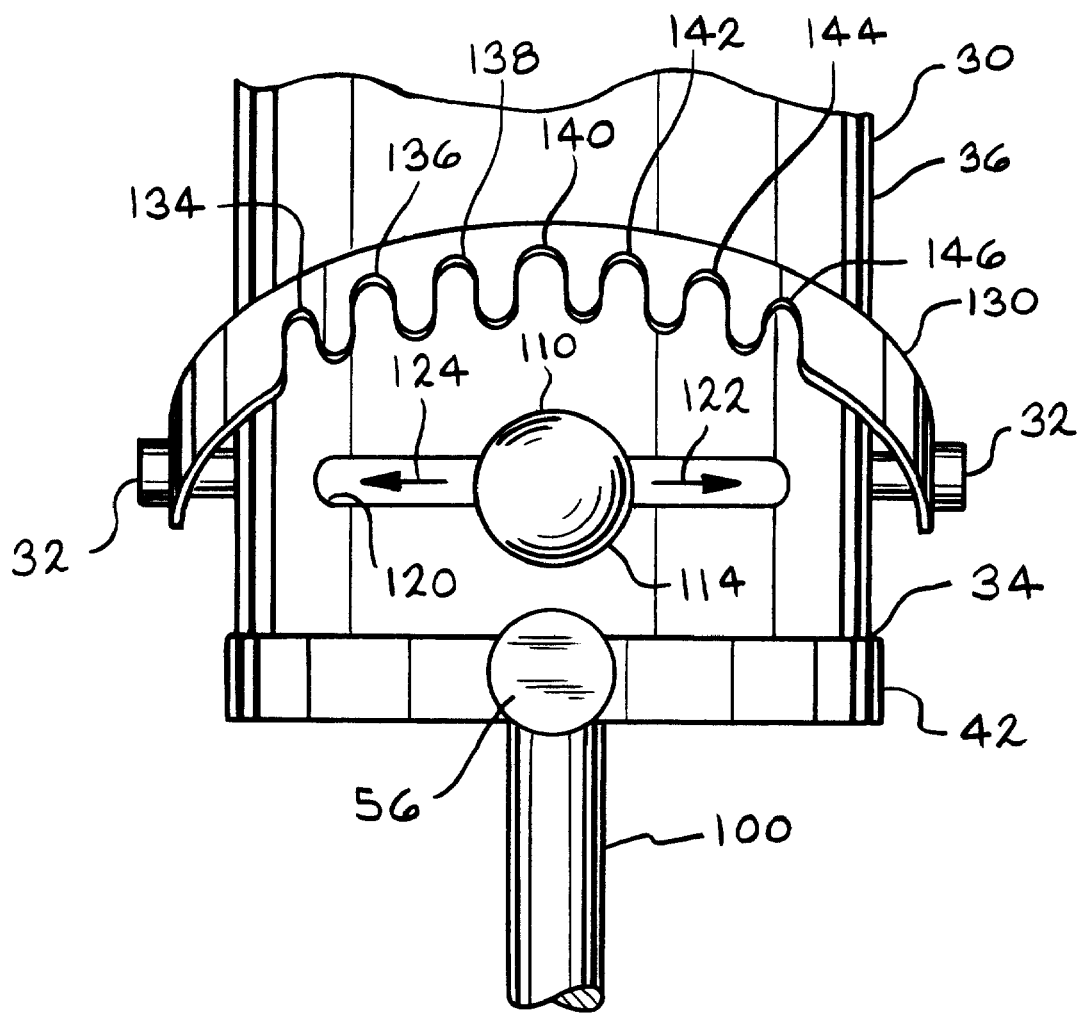
FIG. 8 is a detailed front elevational view of the valve hamper assembly showing the movement of the handle of the assembly.

Referring to FIGS. 4, 5 and 8, the assembly 10 includes a handle 110 having a stem 112. The stem 112 includes a knob end 114 and an attachment end 116. The knob end 114 includes a ball knob 118. The attachment end 116 is fixedly attached to the movable disk 70. As shown in FIG. 8, the housing 30 defines a slot 120. The handle 110 can move within the slot 120 in a first direction indicated by the arrow 122 and an opposite second direction indicated by the arrow 124. Due to the connection of the handle 110 to the movable disk 70, movement of the handle 110 in the directions indicated by the arrows 122 and 124 causes corresponding rotatable movement of the movable disk 70.

Referring to FIGS. 4 and 8, the assembly 10 includes an index gate 130 pivotally mounted on the exterior surface 36 of the housing 30 by bolts 132. The index gate 130 includes first, second, third, fourth, fifth, sixth and seventh indexing grooves 134, 136, 138, 140, 142, 144 and 146, respectively. The stem 112 of the handle 110 is adapted and sized to be received by the indexing grooves 134–146. As it will be appreciated, the number of indexing grooves can vary depending on the application. When the stem 112 of the handle 110 is positioned in one of the indexing grooves 134–146, the handle 110 is maintained in the position defined by the respective groove.

Referring to FIGS. 4–8, the use and operation of the valve hamper assembly 10 of the present invention will now be described. When it is desired to position the second end 94 of the valve 90 with respect to the mold 20, the index gate 130 is pivoted upwardly as shown in FIG. 8. This allows for the movement of the handle 110 in the directions indicated by the arrows 122 and 124 in FIG. 8. This causes corresponding rotatable movement of the movable disk 70. The movement of the rotatable disk 70 causes the follower surface 82 of the movable disk 70 to slidingly engage and travel along the camming surface 80 of the fixed disk 60. This causes movement of the movable disk 70 in the directions indicated by the arrows 84 and 86 in FIG. 7. This causes corresponding vertical movement of the valve 90 due to the operative connection of the valve 90 with the movable disk 70. Once the valve has been positioned with respect to the mold 20, the index gate 30 is lowered as shown in FIG. 4 so that the stem 112 of the handle 110 is received by one of the indexing grooves 134–146. The positioning of the stem 112 in one of the indexing grooves 134–146 maintains the stem 112, the movable disk 70 and the valve 90 in position.

In a preferred embodiment, for example, the predetermined slope S of the camming surface 80 of the fixed disk 60 allows for the incremental movement of the movable disk 70 and thereby the valve 90 in the directions indicated by the arrows 84 and 86 in increments of 0.004 inch (0.1016 millimeter). The increments can be indexed by the position of the stem 112 of the handle 110 in the indexing grooves 134–146. For example, when the stem 112 is positioned in the fourth indexing groove 140, the movable disk 70 and the valve 90 are in "neutral" positions. If the handle 110 is moved in the direction indicated by the arrow 122 in FIG. 8 so that the stem 112 is positioned in the fifth indexing groove 142, the movable disk 70 and thereby the valve 90 are raised by 0.004 inch (0.1016 millimeter) in the direction indicated by the arrow 84 in FIG. 7. If the handle 110 is moved in the direction indicated by the arrow 124 in FIG. 8 so that the stem 112 is positioned in the third indexing groove 138, the movable disk 70 and thereby the valve 90 will fall by 0.004 inch (0.1016 millimeter) in the direction indicated by the arrow 86 in FIG. 7. This allows the second end 94 of the valve 90 to be easily, quickly and accurately positioned with respect to the mold 120.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A valve hamper assembly for a glassware machine comprising:

a glassware machine;

a camming surface positioned on a fixed disk adjacent to said glassware machine;

a follower surface positioned on a movable disk positioned adjacent to said glassware machine, said follower surface engaging said camming surface;

a movable valve operatively connected to said movable disk;

a handle being attached to and extending outwardly from said movable disk for moving said movable disk to cause said follower surface to travel along said camming surface to cause movement of said valve; and a bracket including at least one groove, said handle being received by said groove for maintaining said handle in a predetermined position.

2. The valve hamper assembly of claim 1, wherein said fixed disk includes a top portion and a bottom portion, said camming surface being positioned on said top portion.

3. The valve hamper assembly of claim 1, wherein said movable disk includes an upper portion and a lower portion, said follower surface being positioned on said lower portion.

4. The valve hamper assembly of claim 3, wherein said valve includes a first end and a second end, said first end being operatively connected to said upper portion of said movable disk, said second end being adapted to shape glassware.

5. The valve hamper assembly of claim 1, wherein said handle includes a stem having a knob end and an attachment end, said knob end including a knob and said attachment end being attached to said movable disk.

6. A valve hamper assembly for a glassware machine comprising:

a glassware machine including a mold;

a generally cylindrical fixed disk including a camming surface mounted adjacent to said glassware machine;

a generally cylindrical movable disk including a follower surface mounted adjacent to said glassware machine, said follower surface slidingly engaged with said camming surface;

a movable valve having a first end and a second end, said first end being operatively connected to said movable disk, said second end being positioned adjacent to said mold, said second end being adapted to shape glassware being formed in said mold;

a handle being attached to and extending outwardly from said movable disk for moving said movable disk to cause said follower surface to travel along said camming surface to cause movement of said valve in order to position said second end of said valve in relation to said mold.

an index gate pivotally mounted on said glassware machine adjacent to said handle, said index gate including at least two indexing grooves, said handle being received by one of said at least two indexing grooves for maintaining said handle in a predetermined position.

* * * * *